(12) United States Patent
Hafvenstein

(10) Patent No.: US 11,516,961 B2
(45) Date of Patent: Dec. 6, 2022

(54) AGRICULTURAL PRODUCT METERING MOTOR CREEP CONTROL

(71) Applicant: CNH Industrial America LLC, New Holland, PA (US)

(72) Inventor: David Hafvenstein, Benson, MN (US)

(73) Assignee: CNH INDUSTRIAL AMERICA LLC, New Holland, PA (US)

(*) Notice: Subject to any disclaimer, the term of this patent is extended or adjusted under 35 U.S.C. 154(b) by 656 days.

(21) Appl. No.: 16/514,438

(22) Filed: Jul. 17, 2019

(65) Prior Publication Data
US 2021/0015031 A1 Jan. 21, 2021

(51) Int. Cl.
| *A01C 19/02* | (2006.01) |
| *A01C 7/10* | (2006.01) |
| *F15B 11/042* | (2006.01) |
| *A01C 15/00* | (2006.01) |

(52) U.S. Cl.
CPC .............. *A01C 19/02* (2013.01); *A01C 7/102* (2013.01); *F15B 11/042* (2013.01); *A01C 15/007* (2013.01); *F15B 2211/3057* (2013.01); *F15B 2211/6054* (2013.01)

(58) Field of Classification Search
CPC ....... A01C 7/102; A01C 19/02; A01C 15/007; F15B 11/042; F15B 2211/3057; F15B 2211/6052; F15B 2211/6054; F15B 2211/7058; F15B 2211/7128
See application file for complete search history.

(56) References Cited

U.S. PATENT DOCUMENTS

| 3,855,953 A | 12/1974 | Fathauer et al. |
| 4,098,433 A | 7/1978 | Oligschlaeger |
| 5,846,061 A | 12/1998 | Ledebuhr |
| 5,915,312 A | 6/1999 | Meyer et al. |
| 6,848,473 B2 | 2/2005 | Fiala et al. |

(Continued)

FOREIGN PATENT DOCUMENTS

DE 3619689 A1 12/1987

OTHER PUBLICATIONS

Agri-Direct Mail Order Center; Sprayer Control Valve, Single Switch Control; Apr. 15, 2019; 7 pages; available at: https://www.agrisupply.com/sprayer-control-valve-single-switch-control/p/40298/.

(Continued)

*Primary Examiner* — Thomas E Lazo
(74) *Attorney, Agent, or Firm* — Rebecca Henkel; Rickard DeMille

(57) ABSTRACT

A motor creep control system includes at least one motor and a manifold fluidically coupled to the at least one motor and configured to control flow of a fluid through the at least one motor. The manifold includes an input port, an output port, at least one fluid control valve to control the at least one motor, and a motor creep control valve. A first state of the motor creep control directs the fluid from the input port, through the at least one fluid control and motor, and to the at least one output port. Meanwhile, a second state of the motor creep control in conjunction with the at least one fluid control valve being deactivated directs the fluid from the input port that leaks past the deactivated at least one fluid control valve to the at least one output port, while bypassing the at least one motor.

19 Claims, 5 Drawing Sheets

(56) References Cited

U.S. PATENT DOCUMENTS

| | | | |
|---|---|---|---|
| 6,851,377 B2 * | 2/2005 | Mayerle | F15B 11/162 |
| | | | 111/921 |
| 7,316,110 B2 * | 1/2008 | Schilling | F16D 31/02 |
| | | | 60/327 |
| 7,380,491 B2 * | 6/2008 | Krug-Kussius | F15B 11/163 |
| | | | 60/426 |
| 9,360,005 B2 | 6/2016 | Fedde et al. | |
| 9,854,732 B2 * | 1/2018 | Thompson | A01C 7/102 |
| 9,856,890 B2 | 1/2018 | Tsutsui et al. | |
| 10,051,779 B2 | 8/2018 | Chahley et al. | |
| 2014/0246105 A1 | 9/2014 | Feigel, Jr. et al. | |
| 2018/0149175 A1 | 5/2018 | Zapico | |

OTHER PUBLICATIONS

Preventing Creep in Pressure Regulators; Edmonton Valve & Fitting Blog; Apr. 15, 2019; 3 pages; available at: https://edmontonvalve.swagelok.com/blog/bid/303179/preventing-creep-in-pressure-regulators.

CRC7654; Creef Relief Valve CR-Series; Nirmal; Apr. 11, 2019; 2 pages; available at: https://www.nirmal.co.in/creef-relief-valve-CR-Series.html.

* cited by examiner

AGRICULTURAL PRODUCT METERING MOTOR CREEP CONTROL

FIELD OF THE INVENTION

The invention relates generally to a motor creep control and, more particularly, to an agricultural product metering motor creep control configured to prevent metering motor from creeping and unnecessarily spreading the agricultural product.

BACKGROUND OF THE INVENTION

Agricultural product distribution systems need to be able to apply their products at widely varying rates, hut with great precision. Over-application of product is expensive and may damage the crop, while under-application of product is ineffective. The distribution must be designed for both high-rate distribution of products like fertilizer and low-rate distribution of nutrients, such as sulfur. Current machines use hydraulic fluid control valves, coupled with low-resistance motors, to achieve steady flows across the desired range of operation. However, if there is any leakage through the flow control valve when it is shut off, the low-resistance motor may "creep" (rotate very slowly and jerkily), which results in the distribution of small amounts of agricultural products at undesired times.

SUMMARY OF THE INVENTION

According to an aspect of the invention, a motor creep control system includes at least one motor and a manifold fluidically coupled to the at least one motor and configured to control flow of a fluid through the at least one motor. The manifold includes an input port configured to allow the fluid to enter the manifold, at least one output port configured to allow the fluid to leave the manifold, at least one fluid control valve to control the at least one motor, and a motor creep control valve having a first state and a second state. The first state of the motor creep control directs the fluid within the manifold to flow from the input port, through the at least one motor, and to the at least one output port. Meanwhile, the second state of the motor creep control is used when the fluid control valve is deactivated, and directs the fluid from the input port that leaks past the at least one fluid control valve to the at least one output port, while bypassing the at least one motor.

In accordance with another aspect of the invention, the at least one output port includes a first output port and a second output port. In the first state of the motor creep control, the fluid flows through the at least one motor and leaves the manifold via the first output port when the motor creep control valve is in the first state. In the second state of the motor creep control, the fluid bypasses the at least one motor and leaves the manifold via the second output port when the motor creep control valve is in the second state.

In accordance with yet another aspect of the invention, the manifold also includes a shifting element disposed therein. The shifting element is configured to direct the fluid through the manifold in a first direction or a second direction. In the first direction, the fluid to enters the at least one motor from a first side of the at least one motor, which causes the at least one motor to operate in a first direction. In the second direction, the fluid enters the at least one motor from a second side of the at least one motor, which causes the at least one motor to operate in a second direction.

In accordance with another aspect of the invention, the manifold includes a load sense system to measure the pressure of the fluid within the manifold. A first load sense of the load sense system measures the pressure of the fluid within the manifold when the fluid is moving in the first direction. Meanwhile, a second load sense of the load sense system measures the pressure of the fluid within the manifold when the fluid is moving in the second direction.

According to another aspect of the invention, a method of operating at least one metering motor includes fluidically coupling a manifold to the least one metering motor. The manifold includes an input port configured to allow a fluid to enter the manifold, first and second output ports configured to allow the fluid to leave the manifold, at least one fluid control valve, and a creep control valve. The creep control valve operates in either an activated state configured to bypass the around the at least one motor or a deactivated state configured to direct the fluid through the at least one motor. Further, the activated state is configured to direct the fluid to flow from the input port, through the at least one motor, and to the first output port. Conversely, the deactivated state is configured to direct the fluid from the input port that leaks past a deactivated fluid control valve to the second output port, while bypassing the at least one motor.

In accordance with yet another aspect of the invention, the method includes disposing a shifting element within the manifold. The shifting element is configured to direct fluid through the manifold in either a forward direction or a reverse direction.

In accordance with another aspect of the invention, the creep control valve is operated in the deactivated state and the shifting element is operated in the forward direction to cause the fluid to flow from the input port, through the shifting element, through the at least one motor from a first side of motor to a second side of the motor, and to the first output. The manifold may also include a forward load sense to measure the pressure of the fluid flowing through the manifold when the shifting element is operated in the forward direction.

In accordance with yet another aspect of the invention, the creep control valve is operated in the deactivated state and the shifting element is operated in the reverse direction to cause the fluid to flow from the input port, through the shifting element, through the at least one motor from a second side of the motor to a first side of the motor, and to the first output. The manifold may also include a reverse load sense to measure the pressure of the fluid flowing through the manifold when the shifting element is operated in the reverse direction.

In accordance with another aspect of the invention, the creep control valve is operated in the activated state and the shifting element is operated in the forward direction to cause the fluid to flow from the input port, through the shifting element, to the second output, and bypass the at least one motor. Similarly, the creep control valve is operated in the activated state and the shifting element is operated in the reverse direction to cause the fluid to flow from the input port, through the shifting element, to the second output, and bypass the at least one motor.

According to yet another aspect of the invention, a meter system includes at least one metering device and at least one motor configured to operate a respective metering device, and a manifold fluidically coupled to the at least one motor and configured to control flow of a fluid through the at least one motor. The manifold includes an input port configured to allow the fluid to enter the manifold, a first output port and a second output port configured to allow the fluid to leave the manifold, and a creep control valve having a first state and a second state. When the creep control valve is in the first state, the fluid is directed to flow from the input port, through the at least one motor, and to the first output port. When the creep control valve is in the second state, the fluid is directed to flow from the input port to the second output port, while bypassing the at least one motor.

In accordance with another aspect of the invention, the manifold may also include a shifting element configured to direct the fluid through the manifold in a forward direction or a reverse direction. When operating in the forward direction, the fluid is directed to enter the at least one motor from a first side of the at least one motor, which causes the at least one metering device to operate in a first direction. Conversely, when operating in the reverse direction, the fluid is directed to enter the at least one motor from a second side of the at least one motor, which causes the at least one metering device to operate in a second direction.

In accordance with yet another aspect of the invention, when the creep control is activated and the shifting element is directing the fluid in the forward direction, the fluid flows from the input port, through the shifting element, through the at least one motor from a first side of motor to a second side of the motor, and to the first output. Conversely, when the creep control is deactivated and the shifting element is directing the fluid in the forward direction, the fluid flows from the input port, through the shifting element, and to the second output, while bypassing the at least one motor. When the creep control is deactivated and the shifting element is directing the fluid in the reverse direction, the fluid flows from the input port, through the shifting element, and to the second output, while bypassing the at least one motor.

These and other aspects and features of the present invention will be more fully understood from the following detailed description and the enclosed drawings.

Figure 1:
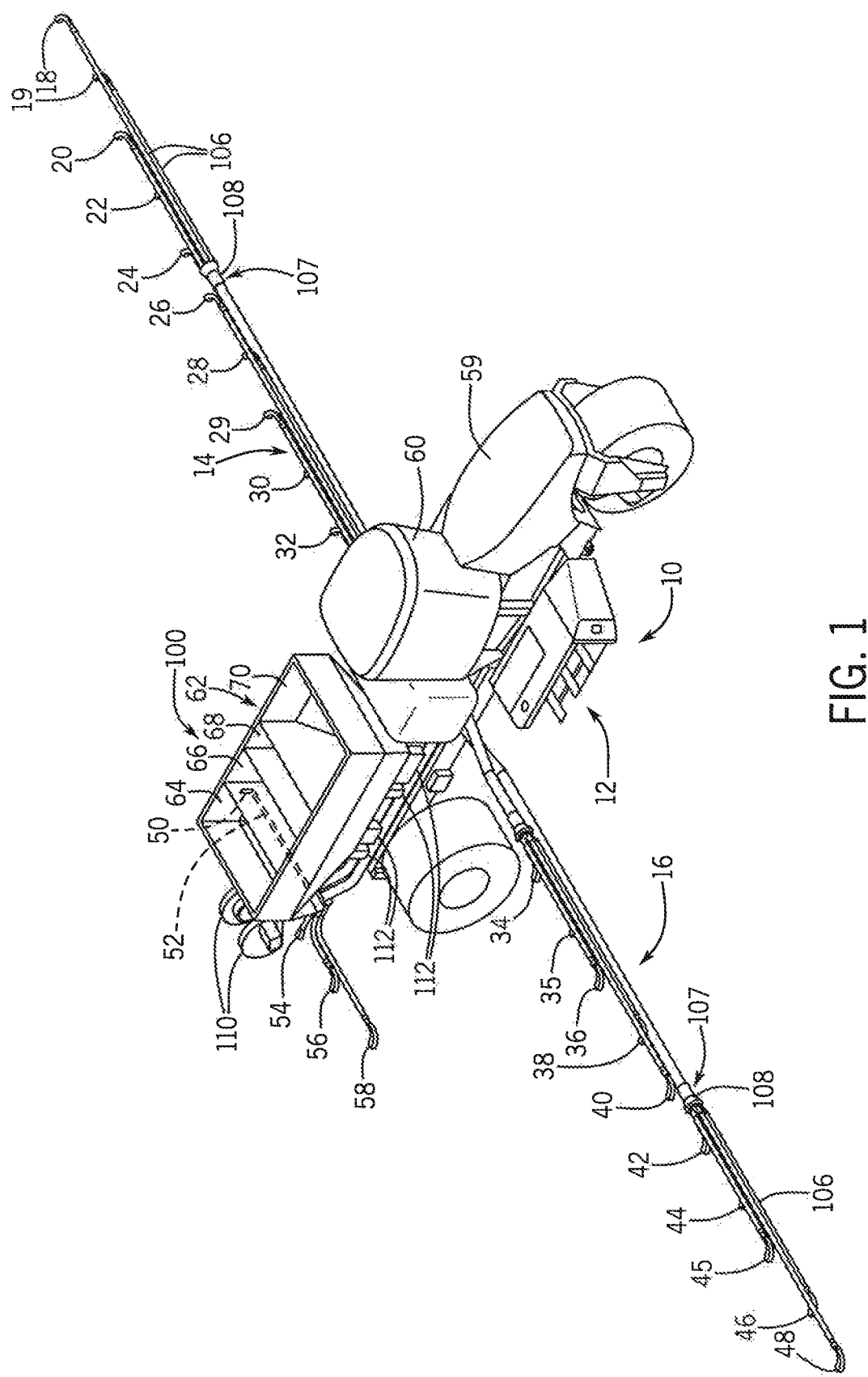
FIG. 1 is a perspective view of an agricultural distribution system.

Before describing any preferred, exemplary, and/or alternative embodiments of the invention in detail, it is to be understood that the invention is not limited to the details of construction and the arrangement of the components set forth in the following description or illustrated in the drawings. The invention is capable of other embodiments or being practiced or carried out in various ways. It is also to be understood that the phraseology and terminology employed herein is for the purpose of description and should not be regarded as limiting.

DETAILED DESCRIPTION

Figure 2:
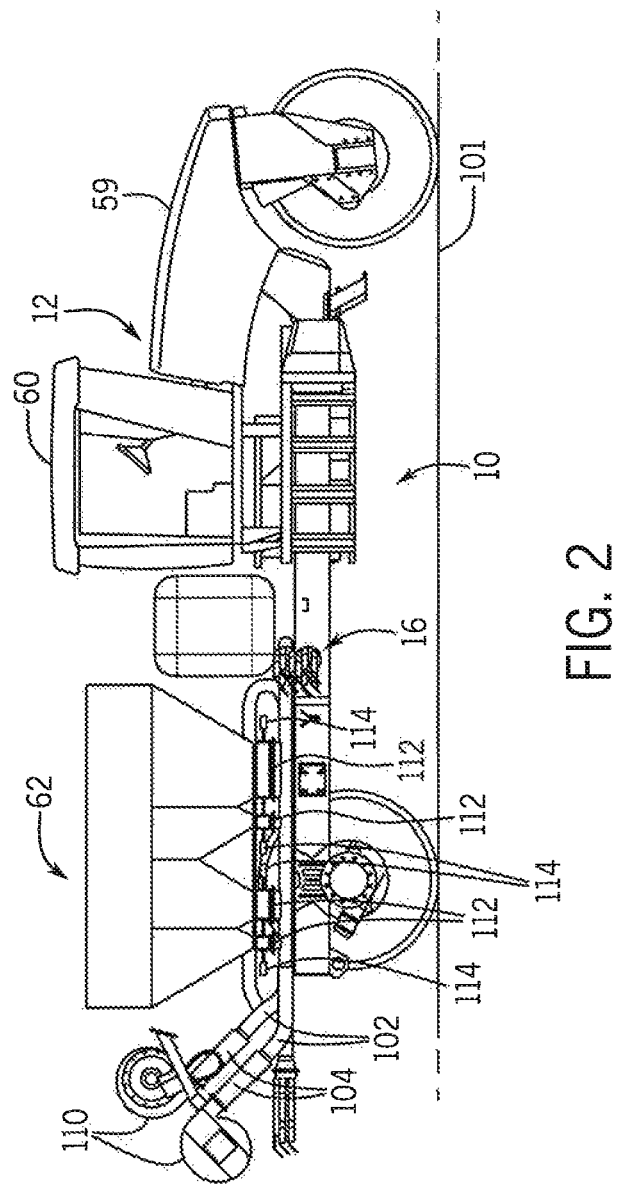
FIG. 2 is a side view of the agricultural distribution system of FIG. 1.
Figure 3:
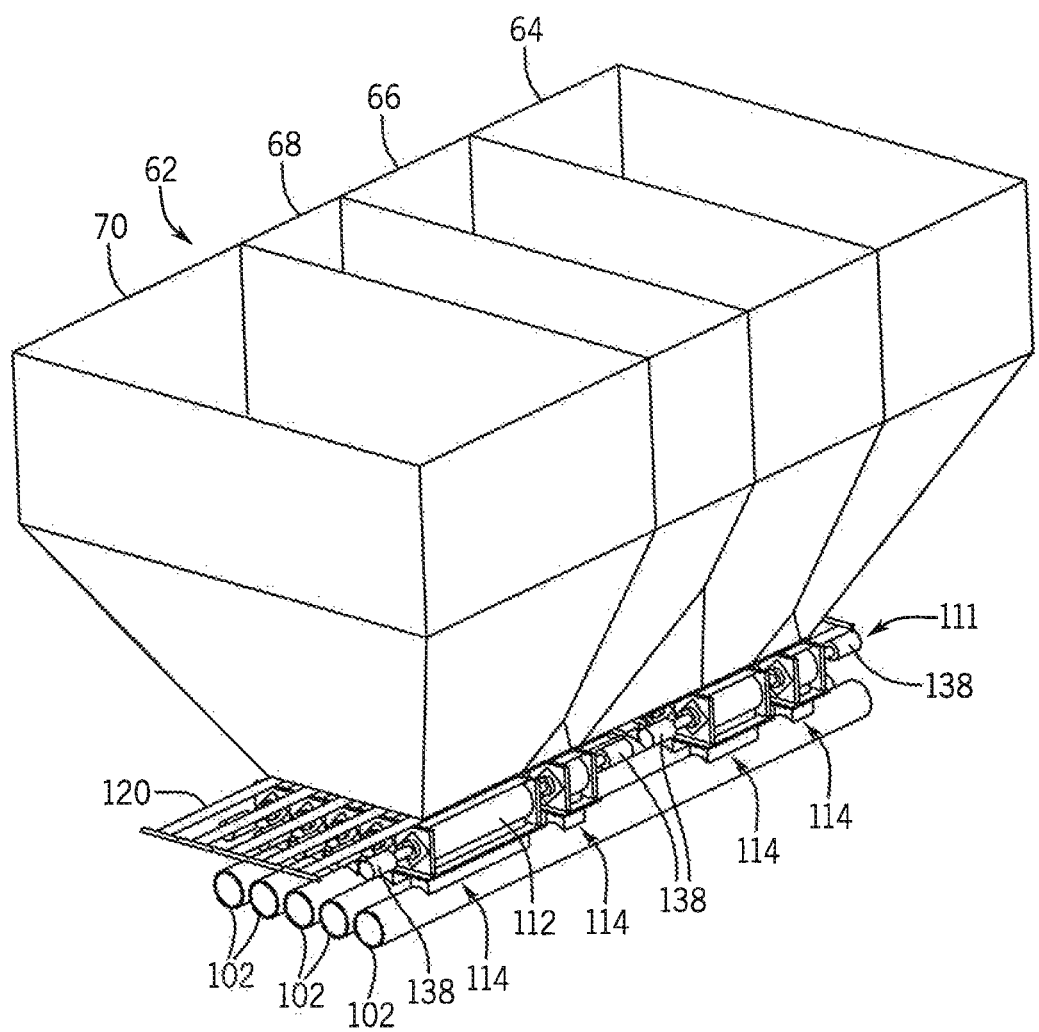
FIG. 3 is a perspective view of a tank and metering system of the distribution system of FIG. 1.

Referring now to the drawings and specifically to FIGS. 1-3, aspects of the invention are shown for use with an agricultural distribution system 10, for example, but not limited to, a fertilizer or dry nutrient distribution system 10. The distribution system 10 generally includes a large tired transport unit 12 such as a truck or tractor, and laterally extending product delivery boom 14, 16. The booms 14, 16 may be pivoted between an operating position, as shown in FIG. 1, and a stowed position adjacent the transport unit 12 for storage or transport. Each boom 14, 16 includes a plurality of boom tubes or conduits terminating at the outboard end in a product delivery unit, which may be in the form of spreading outlets or nozzles. In the exemplary embodiment of the invention, boom 14 includes ten nozzles 18, 19, 20, 22, 24, 26, 27, 29, 30, 32. Similarly boom 16 includes ten nozzles 34, 35, 36, 37, 38, 39, 40, 42, 44, 45, 46, 98.

Additionally, the distribution system 10 may include five nozzles 50, 52, 54, 56, 58 at the rear end thereof to provide full and complete coverage across the width of the distribution system 10, including the area between the inboard-most nozzles 32, 34 of booms 14, 16, respectively. The transport unit 12 is self-propelled by an engine in an engine compartment 59 and includes an operator cab 60, As shown in the exemplary embodiment of the invention, an uncovered tank 62 includes compartments 64, 70 for carrying product, such as fertilizer and dry nutrients, to be distributed to and disbursed by nozzles 18-58. The tank 62 may also include smaller compartments 66, 68 to supply micronutrients or other materials to nozzles 18-58. The product within the compartments 64, 66, 68, 70 may be replenished periodically from a supply vehicle (not shown).

It should be understood that the distribution system 10 shown in FIGS. 1-3 and described herein can be used in conjunction with other agricultural equipment such as tillage, seeding or planting devices. Further, the distribution system 10 is useful in distribution agricultural products other than fertilizer or dry nutrients.

FIGS. 1-3 provide a representative embodiment of the compartments 64-70 of the tank 62. Each are disposed directly above a conveying system 100, such as a pneumatic conveying system 100. The conveying system 100 include five supply lines 102 that extend from a plenum 104 at a rear end of the distribution system 10, underneath the compartments 64-70, and to the booms 14, 16 and the rear nozzles 50, 58. To collect and drive the agricultural product through the supply lines 102, one or more fans 110 are operably connected to the plenum 104 of the supply lines 102. The air flow from the fans 110 is directed through the plenum 104 and into the respective supply lines 102, After the air flow passes through the plenum 104 of the supply lines 102, it collects/entrains the agricultural product from the compartments 64-70 and continues to flow along each of the supply lines 102 to the booms 14, 16 and the rear nozzles 50, 58.

In another embodiment of the invention, it is contemplated that the conveying system 100 may include one or more mechanical conveyors (not shown) taking the form of one or more augers (not shown) that are disposed within the lines 102 and encircle the auger(s) along their length. The augers are each operably connected to a motor (not shown) that causes the augers to rotate within the respective lines 102, moving the agricultural product in conjunction with the air flow through the lines 102. The operation of the motor can be controlled to control the speed of rotation of the augers, either collectively or independently from one another, such that the speed of the conveying system 100 can be varied as desired but not to meter the product(s).

In the representative embodiment of the invention, the agricultural product contained within each of the compartments 64-70 of the tank 62 is introduced into the airflow in the supply lines 102 via an airtight inline product metering system 111, that is formed of a number of metering devices 112 that function to meter the product flowing from the compartments 64-70 into each line 102.

Figure 4:
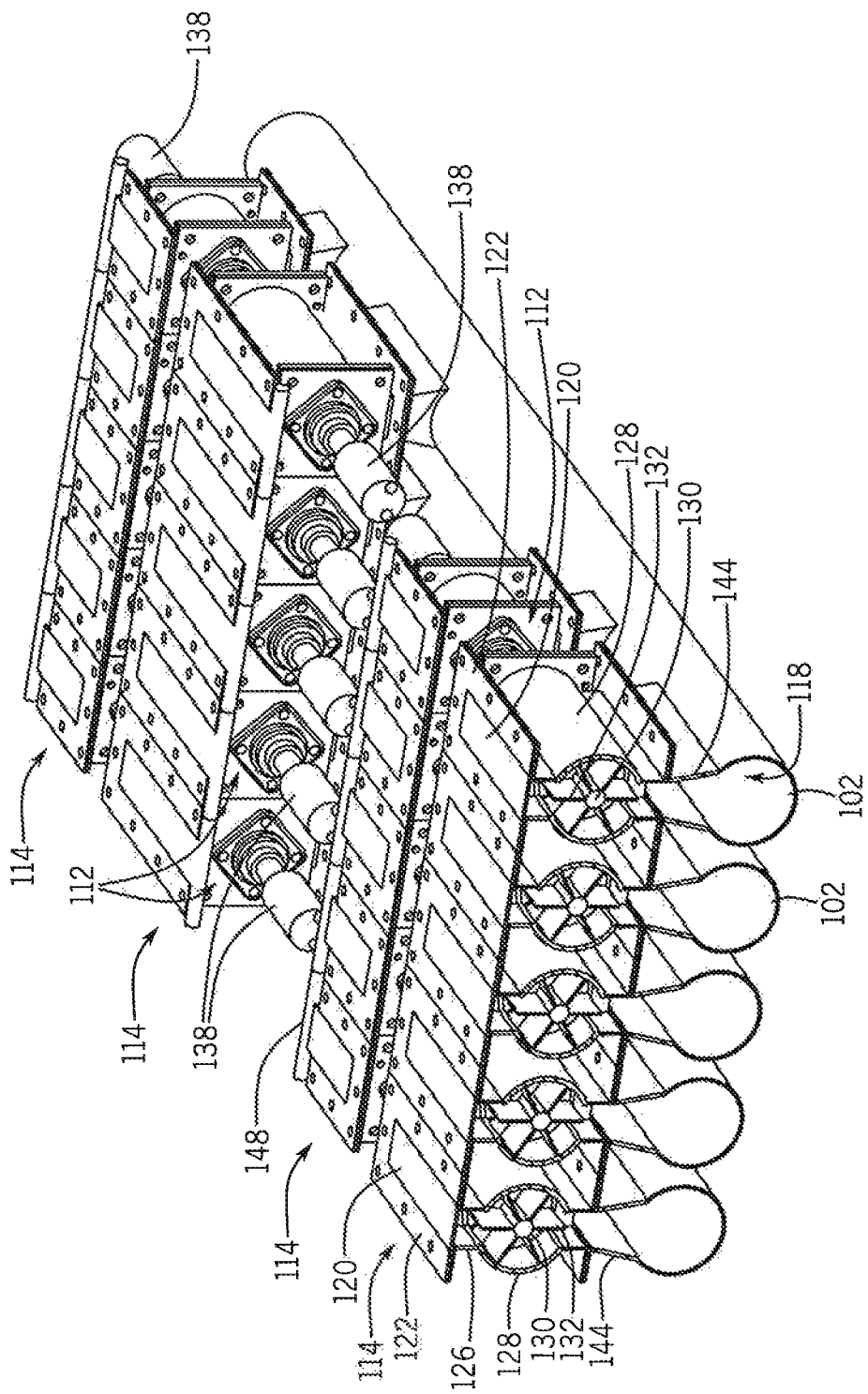
FIG. 4 is a partially broken away, perspective view of the metering system of FIG. 3.

As shown in FIGS. 3 and 4, the metering devices 112 forming the inline metering system 111 are disposed in sets 114 located directly beneath each compartment 64-70 of the tank 62, with each set 114 of metering devices 112 associated with one compartment 64-70 of the tank 62. The metering devices 112 are connected in alignment with their respective compartments 64-70 to enable agricultural product to enter the metering devices 112. The metering devices 112 are also aligned with the supply lines 102 to enable the agricultural product to be dispensed from the metering devices 112 into the supply lines 102. The number of metering devices 112 forming each set 114 corresponds to the number of lines 102 in the conveying system 100, such that the agricultural product from each compartment can be dispensed into each line 102 utilizing the same set 114 of metering devices 112. While the representative embodiment of the invention illustrates the use of five (5) supply lines 102 and metering devices 112, it is contemplated that the conveying system 100 may include any number of supply lines 102 and metering devices 112.

Now referring to FIG. 4, the metering devices 112 each include a gate 120 that is slidably disposed within a guide 122 that is secured to the tank 62 underneath the compartments 64-70 associated with the metering device 112. The gate 120 selectively covers an inlet opening 124 defined within the guide 122 that is aligned with a discharge aperture (not shown) in the adjacent compartment 64-70 and that communicates with an optionally flared or straight inlet channel 126 that extends downwardly from the guide 122. The inlet channel 126 is connected to and communicates with the interior of a housing 128 for a rotating shaft 130. The shaft 130 includes a number of radially extending paddles 132 thereon. The paddles 132 can be positioned on the shaft 130 in any suitable configuration, and in the illustrated exemplary embodiment are positioned equidistant from one another around the circumference of the shaft 130. The paddles 132 extend towards the housing 128 with a gap left between the outer edge 136 of the paddle 132 and the housing 128 in order to prevent particulate material from falling directly through the metering device 112 and prevent or limit the flow of pressurized air from the lines 102 upwardly through the metering device 112 and into the compartments 64-70 by forming a somewhat airtight seal between the paddles 132 and the housing 128. If paddles 132 are non-metallic, they can have an interference fit with housing 128 to make a better air seal.

The shaft 130 is operably connected to a metering motor 138, such as a hydraulic motor or other low-resistance metering motor, that operates to rotate the shaft 130 and the paddles 132 within the housing 128 at the desired speed to meter the flow of the particulate material through the metering device 112 into the supply line 102. As shown in FIG. 4, the housing 128 is connected below the shaft 130 to a discharge channel 144 that extends between the housing 128 and the line 102. In an alternative embodiment, the motor 138, or a separate motor/actuator (not shown), is additionally operably connected to the gate 120 in order to selectively open or close the gate 120 relative to the guide 122, thus controlling the flow of particulate material into the metering device 112 from the compartment 64-70.

Figure 5:
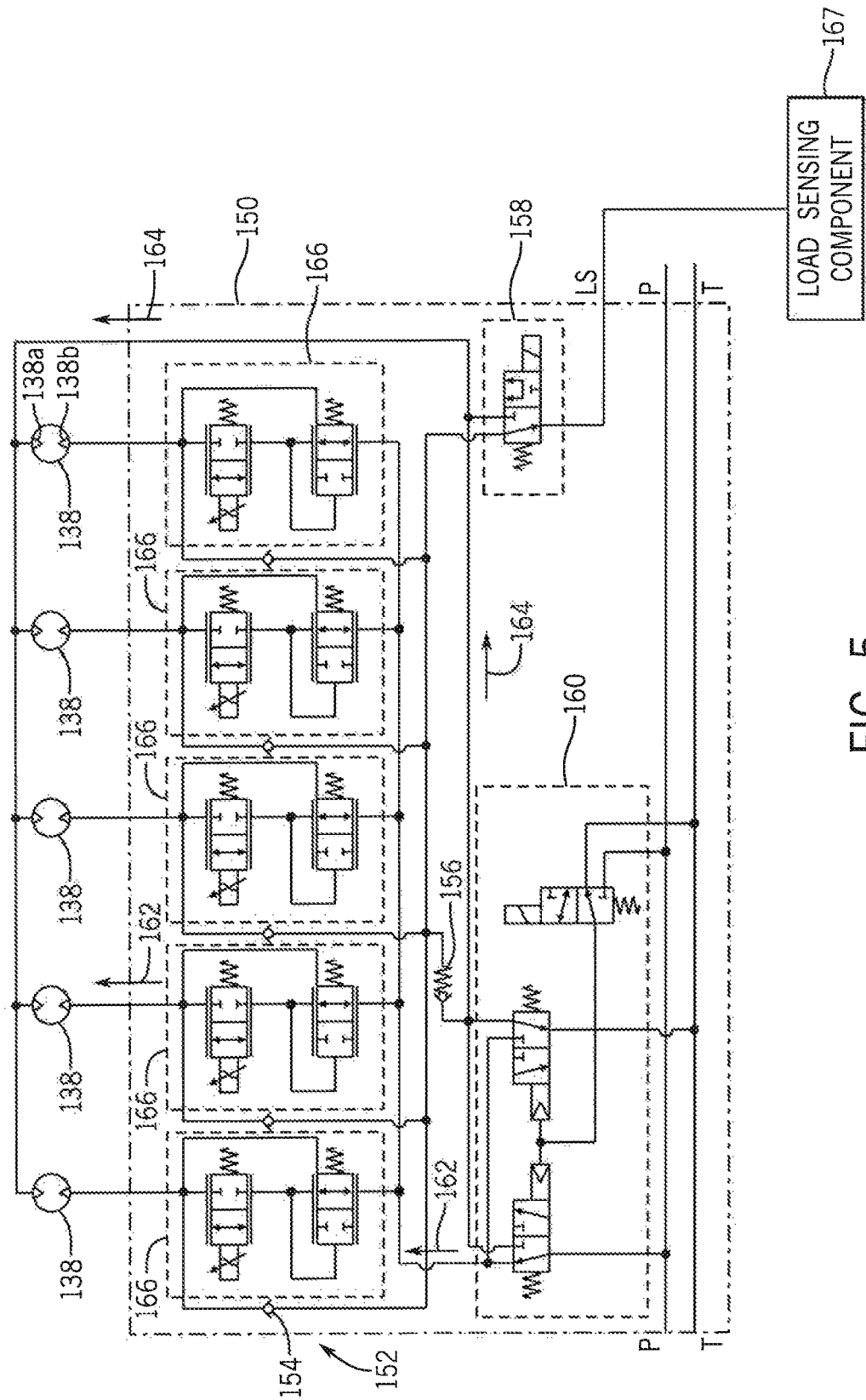
FIG. 5 is a schematic view of a hydraulic flow control manifold of the metering system of FIGS. 2 and 3.

In the representative embodiment of the invention shown in FIG. 5, a hydraulic flow control manifold 150 is coupled to and configured to control the motors 138 described above, which control distribution of the agricultural product by the metering device 112. The manifold 150 includes a number of ports for the flow of hydraulic fluid, including: port P for supplying pressurized hydraulic fluid from a pump to the manifold 150; port T returning hydraulic fluid from the manifold 150 to a tank; and port LS for sending hydraulic fluid from the manifold 150 to a load sensing component 167, such as a pump or pressure regulating valve. It is contemplated that some embodiment of the invention would not include the above discussed load sensing component 167. In such an instance, port LS may be plugged.

The manifold 150 includes a load sense system 152 interactive with the motors 138. The load sense system 152 includes at least one forward load sense check valve 154 and at least one reverse load sense check valve 156. In the representative embodiment of the invention, there are five (5) forward load sense check valves 154 and one (1) reverse load sense check valve 156 disposed on a supply side of a respective motors 138, opposite a return side of the motors 138, Other embodiments of the invention may include any number of forward and reverse load sense check valves 154, 156, or may use shuttle valves or other components to help connect the load sense pressures. In turn, the manifold 150 includes a creep control valve 158 that may fluidically couple the supply side 138a of the motors 138 and the return side 138b of the motors 138, while bypassing the motors 138 themselves. As such, when the creep control valve 158 is activated, the fluid is able to pass from the supply side 138a of the motors 138 to the return side 138b of the motors 138 without passing through and activating the motors 138.

Meanwhile, when the creep control valve 158 is deactivated, the fluid is able to pass to the motors 138 in order to build pressure and operate the motors. In turn, the load sense system 152 is able to determine the pressure of the fluid operating the motors and send those signals through creep control valve 158 and port LS to load sensing component 167.

The manifold 150 also includes a forward-reverse shifting element 160 configured to control the direction fluid flows through the manifold 150 and the motors 138. For example, the fluid may flow in a forward direction 162 and enter the motors 138 from a first side 138a to cause operation of the motors 138 in a first direction and, in turn, rotation of the metering devices 112 in a first direction. In this case, the supply side of the motor 138 is the first side 138a and the return side of the motor 138 is the second side 138b. Alternatively, the fluid may flow in a reverse direction 164 and enter the motors 138 from a second side 138b to cause operation of the motors 138 in a second direction and, in turn, the rotation of the metering devices 112 in a second direction. In such case, the supply side of the motor 138 is the second side 138b and the return side of the motor 138 is the first side 138a.

For example, when the creep control 158 is deactivated and the shifting element 160 has the fluid moving in the forward direction 162, the fluid enters the manifold 150 via port P and flows through the shifting element 160. The fluid is then directed to any number of fluid control valves 166, such as pressure-compensated flow control valves. In the representative embodiment of the invention, there are five (5) fluid control valves 166 and each is associated with one of the five (5) motors 138. Other embodiments of the invention may use any number of fluid control valves 166 and motors 138. The fluid control valves 166 are operated to control the flow rate of the fluid that flows through the motor 138 and manifold 150. When activated, the fluid control valves 166 allow the fluid to flow through the motor 138. When deactivated, the fluid control valves 166 do not allow the fluid to flow through the motor 138. Other embodiments may use different types of fluid control valves to control the pressure or flow rate of the fluid supplied to the metering motors 138 in different ways.

After flowing through the fluid control valves 166, a portion of the fluid may flow to the forward load sense check valve 154, while another portion of the fluid flows to the first side 138a of the motor 138. As a result, the forward load sense check valve 154 is able to measure the pressure of the fluid flowing to the first side 138a of the motor 138. In turn, the fluid control valve 166 is adjusted based on the measurements of the forward load sense check valve 154.

The fluid then flows through the motor 138 to operate the motor 138 and exits the motor at the second side 138b of the motor 138. The fluid then travels from the second side 138b of the motor 138 back to the shifting element 160. The shifting element 160 then directs the fluid to port T in order to return the fluid to the tank.

When the creep control 158 is deactivated and the shifting element 160 has the fluid moving in the second direction 164, the fluid enters the manifold 150 via input port P and flows through the shifting element 160. A portion of the fluid may flow to the reverse load sense check valve 156, while another portion of the fluid is directed to the second side 138b of the motors 138. As a result, the reverse load sense check valve 156 is able to measure the pressure of the fluid as it enters the motor 138 at its second side 138b, and is able to send this pressure signal through the creep control valve 158 and port LS to load sensing component 167.

After flowing through and operating the motor 138, the fluid leaves the motor 138 from its first side 138a and passes to the fluid control valve 166 associated with each motor 138. The representative embodiment uses the fluid control valves 166 to give control of the flow of the fluid as it flows through the manifold 150 and motors 138. The fluid is then moved through the pressure flow controls 166 and to the shifting element 160. The shifting element 160 then directs the fluid to output port T in order to return the fluid to the tank. When the creep control 158 is activated and the shifting element 160 has the fluid moving in the first direction 162, the fluid again enters the manifold 150 via port P and flows through the shifting element 160. Whenever the creep control 158 is activated, no rotation of motor 138 is desired, so the fluid control valves 166 are deactivated, maximally restricting flow. In response to an inevitable amount of fluid that leaks through fluid control valves 166, the creep control 158 is activated. In turn, any fluid leaking pas the fluid control valves 166 in the deactivated state is directed through the forward load sense check valve 154 and bypasses the motor 138 completely. After passing through the forward load sense check valve 154, the fluid is sent through the creep control valve 158. In the activated state, the creep control valve 158 directs the fluid to shifting element 160 in order to return the fluid to the tank through output port T.

In addition to the above, the logic table below presents the system response to varying combinations of activation and deactivation of the creep control 158, the shifting element 160, and the fluid control valves 166.

TABLE 1

| Anti-creep Valve 158 | Shifting Element 160 | Flow Control Element 166 | System Response |
| --- | --- | --- | --- |
| Deactivated | Forward (deactivated) | Deactivated | ORIGINAL PROBLEM CASE (NOT USED): Motors not intended to run, but may creep. |

TABLE 1-continued

| Anti-creep Valve 158 | Shifting Element 160 | Flow Control Element 166 | System Response |
| --- | --- | --- | --- |
| Activated | Forward (deactivated) | Deactivated | FIXED PROBLEM CASE: Motors do not run or creep. |
| Deactivated | Forward (deactivated) | Activated | Motors run controllably in forward, with load sensing signal available at port LS. |
| Activated | Forward (deactivated) | Activated | NOT USED: Motors may or may not run, depending on how restrictive load sense passages are. |
| Deactivated | Reverse (activated) | Deactivated | NOT USED: Motors are not intended to run, but may creep. Put Shifting Element 160 in forward to control creep. |
| Activated | Reverse (activated) | Deactivated | NOT USED: Motors are not intended to run, but may creep. Put Shifting Element 160 in forward to control creep. |
| Deactivated | Reverse (activated) | Activated | Motors run controllably in reverse, with load sensing signal available at port LS. |
| Activated | Reverse (activated) | Activated | NOT USED: Motors run controllably in reverse, but with no load sensing signal available at port LS. |

In the representative embodiment of the invention, when the creep control 158 is in the deactivated state, the fluid is further able to flow through port LS to the load sensing component 167. In embodiments of the invention not including the load sensing component 167, the creep control 158 may become a two-way valve that simply blocks off flow when creep control 158 is deactivated and normal rotation of the motors 138 is desired.

The present invention has been described in terms of the preferred embodiment. The several embodiments disclosed herein are related as being related to the assembly as generally shown in the drawings. It is recognized that equivalents, alternatives, and modifications, aside from those expressly stated, the embodiments summarized, or the embodiment shown in the drawings, are possible and within the scope of the appending claims. The appending claims cover all such alternatives and equivalents.

What is claimed is:

1. A motor creep control system comprising:
at least one motor;
a manifold fluidically coupled to the at least one motor and configured to control flow of a fluid through the at least one motor, wherein the manifold includes:
an input port configured to allow the fluid to enter the manifold;
first and second output ports configured to allow the fluid to leave the manifold; and
at least one fluid control valve having a first state and a second state, each fluid control valve configured to control a respective one of the at least one motor;
a motor creep control valve having a first state and a second state;
wherein the first state of each fluid control valve causes the respective motor to run;
wherein the second state of each fluid control valve causes the respective motor to not run;
wherein the first state of the motor creep control valve is configured to direct the fluid within the manifold to flow from the input port, through the at least one motor, and to the first output port; and wherein the second state of the motor creep control valve is configured to direct the fluid leaking past the at least one fluid control valve in the second state from the input port to the second output port, while bypassing the at least one motor.

2. The system of claim 1 further comprising a shifting element disposed within the manifold;

wherein the shifting element is configured to direct the fluid through the manifold in a first direction or a second direction.

3. The system of claim 2 wherein the first direction of fluid flow is configured to cause the fluid to enter the at least one motor from a first side of the at least one motor, which causes the at least one motor to operate in a first direction; and wherein the second direction of fluid flow is configured to cause the fluid to enter the at least one motor from a second side of the at least one motor, which causes the at least one motor to operate in a second direction.

4. The system of claim 2 wherein the manifold further includes a load sense system including a first load sense check valve and a second load sense check valve;

wherein the first load sense check valve measures the pressure of the fluid within the manifold when the fluid is moving in the first direction; and wherein the second load sense check valve measures the pressure of the fluid within the manifold when the fluid is moving in the second direction.

5. A method of operating at least one metering motor comprising:

fluidically coupling a manifold to the least one metering motor, the manifold including:

an input port configured to allow a fluid to enter the manifold;

first and second output ports configured to allow the fluid to leave the manifold; and at least one fluid control valve configured to control a respective one of the at least one metering motor, each fluid control valve having an activated state to allow fluid to pass through the metering motor and a deactivated state to prevent fluid from passing through the metering motor;

a creep control valve having an activated state configured to bypass the at least one motor and a deactivated state configured to direct the fluid through the at least one motor;

wherein the activated state of the creep control valve is configured to direct the fluid leaking past the at least one fluid control valve in the deactivated state to flow from the input port, and to the second output port, while bypassing the at least one metering motor; and wherein the deactivated state of the creep control valve is configured to direct the fluid from the input port, through the at least one metering motor, and to the first output port.

6. The method of claim 5 disposing a shifting element within the manifold, the shifting element configured direct the fluid through the manifold in a forward direction or a reverse direction.

7. The method of claim 6 further comprising operating the at least one fluid control valve in the activated state, operating the creep control valve in the deactivated state, and operating the shifting element in the forward direction to cause the fluid to flow from the input port, through the shifting element, through the at least one motor from a first side of motor to a second side of the motor, and to the output.

8. The method of claim 7 wherein the manifold further includes a forward load sense check valve; and wherein the fluid flows through the forward load sense check valve to measure the pressure of the fluid flowing through the manifold.

9. The method of claim 6 further comprising operating the at least one fluid control valve in the activated state, operating the creep control valve in a deactivated state, and operating the shifting element in the reverse direction to cause the fluid to flow from the input port, through the shifting element, through the at least one motor from a second side of the motor to a first side of the motor, and to the output.

10. The method of claim 9 wherein the manifold further includes a rear load sense check valve; and wherein the fluid flows through the rear load sense check valve to measure the pressure of the fluid flowing through the manifold.

11. The method of claim 6 further comprising operating the at least one fluid control valve in the deactivated state, operating the creep control valve in an activated state, and operating the shifting element in the forward direction to cause the fluid to flow from the input port, through the shifting element, and to the output;

wherein the fluid bypasses the at least one motor.

12. The method of claim 5 wherein the first output port configured to allow fluid to flow from the manifold to a load sensing component, when the creep control valve is in the deactivated state.

13. A metering system comprising:

at least one metering device;

at least one motor configured to operate a respective one of the at least one metering device; and a manifold fluidically coupled to the at least one motor and configured to control flow of a fluid through the at least one motor, wherein the manifold includes:

an input port configured to allow the fluid to enter the manifold;

first and second output ports configured to allow fluid to leave the manifold;

at least one fluid control valve configured to control a respective one of the at least one motor, each fluid control valve having a first state to allow fluid to pass through the motor and a second state to prevent fluid from passing through the motor; and a creep control valve having a first state and a second state;

wherein the first state of the creep control valve is configured to direct the fluid leaking past the at least one fluid control valve in the second state to flow from the input port, through the at least one motor, and to the first output port; and wherein the second state of the creep control valve is configured to direct the fluid to flow from the input port to the second output port, while bypassing the at least one motor.

14. The system of claim 13 wherein the manifold further comprises a shifting element disposed therein and configured to direct the fluid through the manifold in a forward direction or a reverse direction.

15. The system of claim 14 wherein the forward direction of fluid flow is configured to cause the fluid to enter the at least one motor from a first side of the at least one motor, which causes the at least one metering device to operate in a first direction; and wherein the reverse direction of fluid flow is configured to cause the fluid to enter the at least one motor from a second side of the at least one motor, which causes the at least one metering device to operate in a second direction.

16. The system of claim 14 wherein when the creep control valve is in the first state, the at least one fluid control valve is in the first state, and the shifting element is directing the fluid in the forward direction, the fluid flows from the input port, through the shifting element, through the at least one motor from a first side of motor to a second side of the motor, and to the first output.

17. The system of claim 14 wherein when the creep control is in the first state, the at least one fluid control valve is in the first state, and the shifting element is directing the fluid in the reverse direction, the fluid flows from the input port, through the shifting element, through the at least one motor from a second side of the motor to a first side of the motor, and to the first output.

18. The system of claim 14 wherein when the creep control valve is in the second state, the at least one fluid control valve is in the second state, and the shifting element is directing the fluid in the forward direction, the fluid flows from the input port, through the shifting element, and to the second output, while bypassing the at least one motor.

19. The system of claim 13 wherein the manifold further includes a first output port configured to allow fluid to flow from the manifold to a load sensing component, when the creep control valve is in the first state.

\* \* \* \* \*